United States Patent
Capp et al.

[15] 3,676,431
[45] July 11, 1972

[54] PRODUCTION OF CAPROLACTAM

[72] Inventors: Clifford William Capp, Ewell, Surrey; Keith Warwick Denbigh, Epsom, Surrey, both of England

[73] Assignee: BP Chemicals (U.K.) Limited, London, England

[22] Filed: May 21, 1968

[21] Appl. No.: 730,941

[30] Foreign Application Priority Data

June 2, 1967 Great Britain......................25,686/67

[52] U.S. Cl. .......................................260/239.3 A, 260/586
[51] Int. Cl. ........................................................C07d 41/06
[58] Field of Search..............................................260/239.3

[56] References Cited

OTHER PUBLICATIONS

Derwent's "Belgian Patents Reports" 12/68, abstracting Belgian Patent 704,214 granted Sept. 22, 1967

Primary Examiner—Henry R. Jiles
Assistant Examiner—Robert T. Bond
Attorney—Jacobs & Jacobs

[57] ABSTRACT

In the production of caprolactam by reaction of 1,1'-peroxydicyclohexylamine with alkali metal alkoxides, the reaction is carried out in a reaction medium which is a mixture of methanol and dimethylsulphoxide.

7 Claims, No Drawings

PRODUCTION OF CAPROLACTAM

The present invention relates to a process for the production of lactams. Processes for the production of lactams are described in Belgian Pat. No. 704,214.

According to the present invention the process for the production of caprolactam comprises reacting 1,1'-peroxydicyclohexylamine, with an alkali metal alkoxide in solution in a reaction medium which is a mixture of methanol and dimethyl sulphoxide.

1,1'-Peroxydicyclohexylamine and a process for its production are described in Belgian Pat. No. 701,327.

The alkoxide used may be the solid alkoxide obtained by any of the known methods, which may be fed to the reaction as such or dissolved in a solvent. It is not necessary to isolate the alkoxide however, and instead of using pre-formed solid alkoxide, the alkoxide may be formed in the reaction medium or a component of the reaction medium. Thus the alkoxide may be formed by reaction of alkali metal with the methanol constituent of the reaction medium. This is most conveniently done before the methanol is mixed with the dimethyl sulphoxide.

In both the methods of introducing alkoxide into the reaction medium, the alkoxide is substantially the only alkali metal compound fed to the reaction medium.

A less preferred way of carrying out the reaction is to use a mixture of alkali metal hydroxide and alkanol, such solutions containing alkoxide and hydroxide in equilibrium. The presence of the water produced by the reaction of the alkanol with the alkali metal hydroxide may however give rise to side reactions.

The quantity of methanol used is preferably in excess of 1 mole of methanol per mole of alkali metal alkoxide. Preferably the quantity of methanol is such that both the alkali metal alkoxide and peroxyamine(1,1'-peroxydicyclohexylamine) are dissolved.

The molar ratio of alkoxide to 1,1'-peroxydicycloalkylamine may vary over a moderately wide range but it has been found that good yields of caprolactam at very low ratios are obtained. Examples of suitable molar ratios of alkoxide to 1,1'-peroxydicyclohexylamine are those in the range 0.05:1 to 2:1, preferably 0.1:1 to 1:1. Alkoxides are expensive and low ratios of alkoxide to 1,1'-peroxydicyclohexylamine will therefore be generally used.

The reaction between the 1,1'-peroxydicycloalkylamine and the alkali metal alkoxide is carried out in solution in a mixture of methanol and dimethyl sulphoxide. Thus when using butoxides it is preferred to dissolve them in methanol. The proportions of methanol and dimethyl sulphoxide in the mixture may vary over a moderately wide range. Examples of suitable mole ratios of methanol to dimethyl sulphoxide are those in the range 0.3:1 to 3.0:1, in particular 1:1 to 2:1. A particularly preferred range is 1.7:1 to 1.8:1.

The concentration of the peroxyamine in solution may vary over a moderately wide range for example from 0.1 to 2 g. mole per liter solvent.

The 1,1'-peroxydicycloalkylamine and the alkali metal alkoxide may be reacted together by mixing them together with the solvents at moderately elevated temperatures. Examples of suitable moderately elevated temperatures are those in the range 50° to 150°C.

The peroxyamine may be heated with the alkali metal alkoxide over a moderate range of times for example for times in the range 0.5 to 10 hours. It is preferred to heat the peroxyamine for sufficient time to decompose it substantially completely.

The reaction may be carried out over a moderately wide range of pressures including sub-atmospheric as well as super-atmospheric pressures and may be carried out batchwise or continuously.

The caprolactam produced by the process of the present invention may be recovered in any suitable manner, e.g. by distillation or extraction or combinations of these methods. Thus the reaction mixture may be diluted with water followed by extraction of the mixture by a liquid which is immiscible with water and is a solvent for the lactam. Examples of suitable liquids are aromatic compounds (e.g. benzene, xylene) lower paraffins (e.g. hexane, heptane) and chlorinated hydrocarbons especially the chlorinated lower aliphatic hydrocarbons e.g. methylene chloride, chloroform and dichloroethane. Ethers, e.g. diethyl ether may also be used. The liquid used to extract the lactam is then distilled from the extract to leave lactam and cycloalkanone, which may be separated by, e.g. distillation.

The invention will now be illustrated by the following examples.

EXAMPLE 1

A series of experiments were carried out in which metallic sodium was dissolved in methanol to give sodium methoxide solution. Dimethyl sulphoxide and 1,1'-peroxydicyclohexylamine were added to the solution which was then heated and agitated in a sealed glass tube until no more peroxide could be detected. The resulting solution was then added to water and subjected to successive extractions with chloroform to remove all caprolactam and cyclohexanone present in the reaction mixture. The combined extracts were then analyzed by gas chromatography. The quantities of reactants, the reaction temperature and the quantities of caprolactam and cyclohexanone obtained are given in the accompanying table under Runs 1 to 10.

EXAMPLE 2

This example is a comparative example not according to the invention. The procedure of Example 1 was repeated but without any dimethyl sulphoxide being added. The quantities used and the results obtained are shown in the accompanying table under Runs 11 and 12.

A comparison of Runs 10 and 11 will show that for the same reaction times higher conversions were obtained when a mixture of methanol and dimethyl sulphoxide was used than were obtained when methanol alone was used, in other words the reaction proceeded more rapidly. A comparison of Runs 10 and 12 shows that when sufficient time was allowed for the reaction using methanol alone to reach the same degree of conversion of peroxyamine as was obtained when a mixture of methanol and dimethyl sulphoxide was used, the yield of lactam was lower using methanol alone, than when using the mixture of methanol and dimethyl sulphoxide.

| Run No. | Ratio moles methanol/ moles DMSO | Sodium (g. atoms) | G. moles 1,1'-peroxy dicyclo-hexylamine | Total moles of solvent | Reaction temperature (° C.) | Reaction time, hours | Conversion of 1,1'-peroxy-dicyclo-hexylamine, percent of charge | Yield, mole/100 moles 1,1'-peroxydicyclo-hexylamine Caprolactam | Yield, mole/100 moles 1,1'-peroxydicyclo-hexylamine Cyclo-hexanone |
|---|---|---|---|---|---|---|---|---|---|
| 1 | 0.250 | 0.008 | 0.047 | 0.617 | 110 | 2.0 | 100 | 61.5 | 39.6 |
| 2 | 1.050 | 0.008 | 0.047 | 0.725 | 110 | 2.0 | 100 | 81.5 | 77.2 |
| 3 | 1.050 | 0.016 | 0.047 | 0.725 | 110 | 1.5 | 100 | 85.6 | 53.6 |
| 4 | 1.75 | 0.008 | 0.047 | 0.776 | 110 | 2.0 | 100 | 88.5 | 103.0 |
| 5 | 1.75 | 0.016 | 0.047 | 0.776 | 110 | 1.5 | 100 | 84.1 | 64.3 |
| 6 | 2.92 | 0.008 | 0.047 | 0.829 | 110 | 2.0 | 100 | 74.0 | 97.9 |
| 7 | 2.92 | 0.016 | 0.047 | 0.829 | 110 | 1.5 | 100 | 76.8 | 77.1 |
| 8 | 5.15 | 0.008 | 0.047 | 0.883 | 110 | 2.0 | 100 | 64.3 | 79.6 |
| 9 | 5.25 | 0.016 | 0.047 | 0.883 | 110 | 1.5 | 100 | 67.4 | 86.0 |
| 10 | 1.75 | 0.008 | 0.047 | 0.776 | 110 | 1.5 | 99 | 84.0 | 96 |
| 11 | (1) | 0.008 | 0.047 | 0.99 | 110 | 1.5 | 90 | Not estimated | |
| 12 | (1) | 0.008 | 0.047 | 0.99 | 110 | 2.0 | 99 | 64.3 | 102.8 |

[1] Methanol alone.

We claim:

1. A process for the production of caprolactam, which comprises heating at a temperature of from 50°C to 200°C a mixture of 1,1'-peroxydicyclohexylamine and an alkali metal alkoxide in a molar ratio of said alkali metal alkoxide to said 1,1'-peroxydicyclohexylamine of from 0.05:1 to 2:1 in a reaction medium comprising methanol and dimethyl sulphoxide in a molar ratio of methanol to dimethyl sulphoxide of from 0.3:1 to 3:1.

2. The process according to claim 1 wherein the molar ratio of methanol to dimethyl sulphoxide is in the range 1:1 to 2:1.

3. The process according to claim 1 wherein the alkoxide is formed in the reaction medium or in a component of the reaction medium.

4. The process according to claim 3 wherein the alkoxide is formed by the reaction of alkali metal with the methanol component of the reaction medium.

5. The process according to claim 3 wherein the alkoxide is formed by the reaction of alkali metal hydroxide with the methanol component of the reaction medium.

6. The process according to claim 1 wherein the molar ratio of alkali metal alkoxide to 1,1'-peroxydicyclohexylamine is in the range 0.1 to 1:1.

7. The process according to claim 1 wherein the 1,1'-peroxydicyclohexylamine is heated with alkali metal alkoxide for a time in the range 0.5 to 10 hours.

* * * * *